April 30, 1968 D. G. WICKHAM 3,380,919
PREPARATION OF FERROMAGNETIC NiMO₃
Filed Feb. 6, 1964

INVENTOR.
DONALD G. WICKHAM
BY Samuel Lindenberg
ATTORNEY

United States Patent Office 3,380,919
Patented Apr. 30, 1968

3,380,919
PREPARATION OF FERROMAGNETIC NiMnO₃
Donald G. Wickham, Santa Monica, Calif., assignor to Ampex Corporation, Culver City, Calif., a corporation of California
Filed Feb. 6, 1964, Ser. No. 342,938
2 Claims. (Cl. 252—62.51)

ABSTRACT OF THE DISCLOSURE

Method of preparing NiMnO₃ in a pure state through the coprecipitation of nickelous and manganous oxalates from aqueous solutions of soluble nickelous and manganese salts. Weights of the salts are selected corresponding to a desired molar ratio of Mn/(Ni+Mn). The precipitated oxalate is converted to the desired compound, NiMnO₃, through the heating thereof to a temperature within a select range in the presence of air or a supply of oxygen.

---

This invention relates to a new method of preparation for ferromagnetic crystalline compounds having the formula NiMnO₃.

Recently, utilization of ferromagnetic compounds has come into prominence in many areas. Of particular importance is the compound NiMnO₃ which is a complex of oxides of manganese and nickel. The compound has a rhombohedral-ilmenite crystal structure. It is additionally ferromagnetic up to a temperature of 164° C. The powdered material possesses a high coercive force of about 400 oersteds. The coercive force can be increased above 1000 oersteds by cold working. Because the material NiMnO₃ has no loss characteristics at high frequencies and has a relatively high coercive force, it is particularly useful in applications such as magnetic recording tape or high permanent magnets.

Other ferromagnetic crystalline oxides have found greater utilization to date than the ferromagnetic NiMnO₃, though such other compounds do not necessarily possess the excellent properties of the subject compound. The reason for NiMnO₃ not being widely used is that it was extremely difficult to manufacture under previously utilized techniques. Heretofore, the procedure for making NiMnO₃ was described in Patent No. 2,770,523, and involved the reactivity of NiO and MnO₂ in a high pressure vessel at 500° C. and 1000 atmospheres pressure. This particular method is a very difficult one and the yields are extremely low. Furthermore, the resultant desired product does not have a high purity. Thus, its full potential as a useful compound could not be readily achieved.

Thus, it is an object of this invention to provide a new method of manufacture of ferromagnetic NiMnO₃.

An additional object of the invention is to provide a new method for obtaining a highly pure NiMnO₃ product.

A further object of this invention is to provide a relatively simple method for the production of the ferromagnetic compound NiMnO₃.

The above and other objects of the invention are accomplished by a method of preparing NiMnO₃, through the coprecipitation of nickelous and manganous oxalates from aqueous solutions of soluble nickelous and manganous salts. The precipitated oxalate is converted to the desired compound, NiMnO₃, through the heating thereof to a temperature between 600 and 740° C. in the presence of air or up to 780° C. in a supply of oxygen, as will be further shown and explained.

Figure 1:
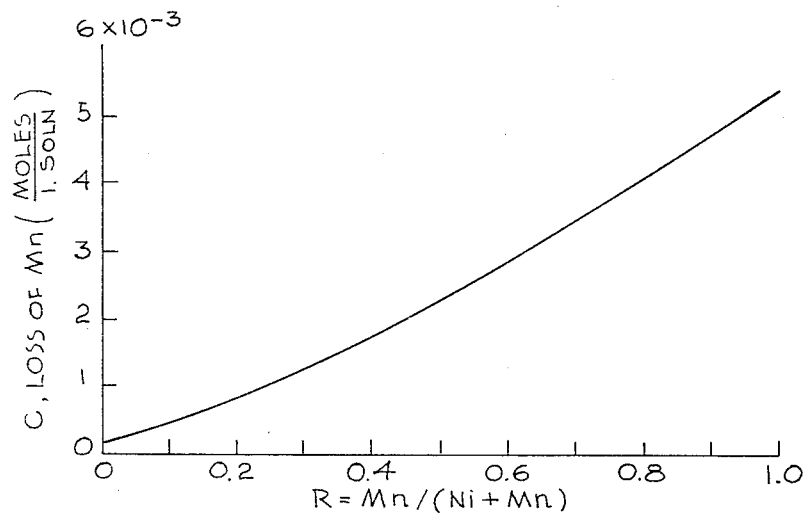
Figure 2:
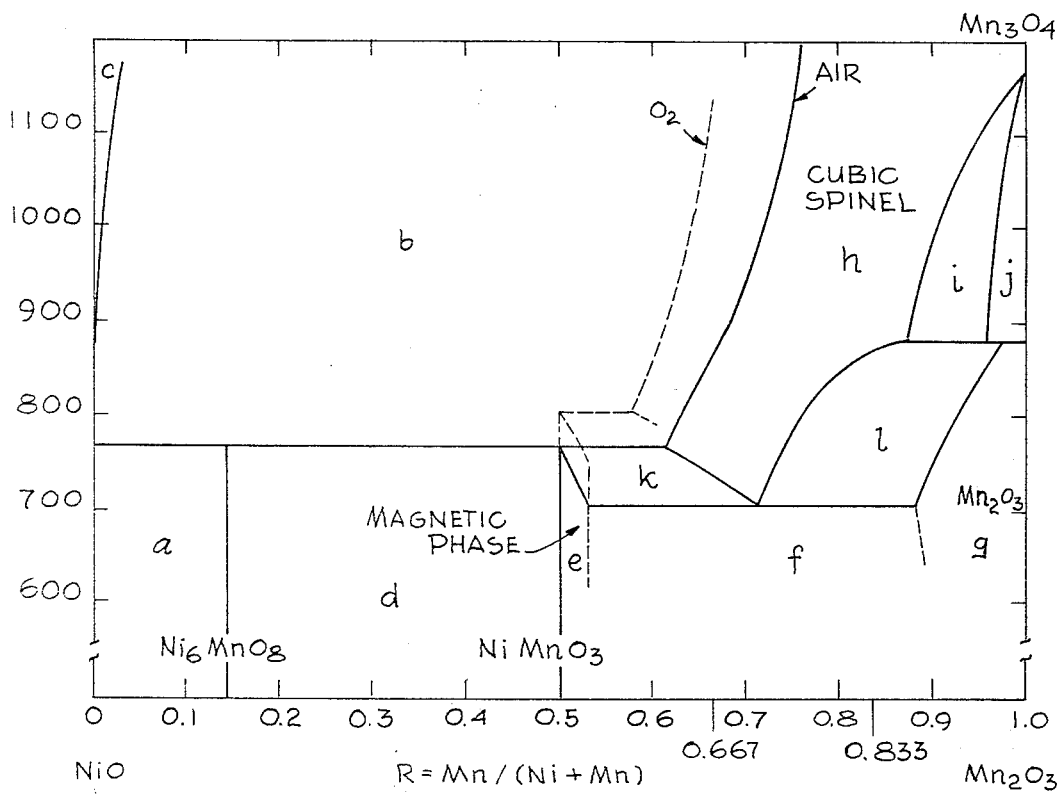

The above invention will be better understood from the following detailed description and examples in which:

FIGURE 1 is a chart depicting the loss of manganese as moles per liter solution in the coprecipitation of nickel and manganous oxides, and FIGURE 2 is a phase diagram for the system

NiO—Mn₂O₃—O₂

The method of the present invention was derived in the course of a thorough study of the system

NiO—Mn₂O₃—O₂ for oxygen pressures of 0.21 and 1.00 atmosphere to temperatures between 600° C. to 1200° C. A complete phase diagram for this system which was derived is shown in FIGURE 2. It can be seen from FIGURE 2 that the particular concerned magnetic phase $Ni_{1-p}Mn_pO_3$ exists for a certain small range of the value of $p$ and for temperatures varying from 700° to about 805° C., depending upon the value of $p$ and the oxygen pressure. The phase should be stable at even higher temperatures under greater oxygen pressures, although such was not attempted.

As can be seen from the phase diagram of FIGURE 2, a single-phase material having the composition NiMnO₃ cannot be obtained at temperatures in excess of 760°±5° C. in the presence of air. At this temperature range or below, the usual prior procedure for making the compound whereby the oxides NiO and Mn₂O₃ are reacted together cannot be used. These individual oxides are refractory and react extremely slowly. It is therefore necessary that the nickel and manganese are mixed on an atomic scale in some form that can subsequently be changed to an oxide. According to the herein method of this invention, this is affected by coprecipitating nickelous and manganous oxalates from aqueous solutions of soluble nickel and manganous salts.

The phase diagram of FIGURE 2 is the key to the limitations of the temperature ranges and values for the preparation of the compound NiMnO₃ in accordance with the method of this invention. The following Example I describes the preparation and analysis of the samples which served to construct a phase diagram of the system NiO—Mn₂O₃—O₂.

EXAMPLE I

The acetates Ni(OAc)₂·4H₂O and Mn(OAc)₂·4H₂O were freshly crystallized from acetic acid, dried in air and stored in tightly stoppered bottles. Weights of the salts were taken corresponding to the desired molar ratio R which is defined as Mn/(Ni+Mn). The total number of moles (Ni+Mn) was made to equal 0.1+C where C was a small correction for the manganese which remained in solution after precipitation of oxalates. The acetates were dissolved in 400 ml. of approximately 4% acetic acid solution. While this solution was boiled and vigorously stirred, 100 ml. of oxalic acid solution containing the equivalent quantity of oxalic acid plus an excess of 0.3 gram was quickly added. The mixture of precipitated oxides and solution was then stirred and boiled for ten minutes. The oxalates, when cooled, were separated on a filter, washed and dried.

In order to check the value of C, the filtrate was evaporated to dryness, the residue ignited at 700° C. and weighed as Mn₂O₃. A very accurate value for C is not easily predictable, but the results show that an average value could be used to better control the composition of the precipitate. Values of C obtained are plotted in FIGURE 1, in which it can readily be seen that C is a function of R. In the experiments, there was a variation of C for a constant value of R which is indicative of the difficulty of controlling variables such as the efficiency of stirring and the rate of addition of oxalic acid.

EXAMPLE II

In accord with the above example, a number of oxide samples were prepared with a range of values for R. The oxides were decomposed by slow ignition in an oxygen atmosphere to a temperature between 400 and 500° C. The samples were then heated at controlled temperatures between 600 and 1150° C. for periods of time sufficient to bring about equilibrium among the solid phases and the atmosphere which was either air or pure oxygen.

X-ray diffraction patterns were obtained for each oxide sample. Next, the oxidizing power of each oxide sample was determined by dissolving the sample in an excess of a standard sulfuric acid-vanadyl sulfate solution. The excess was titrated with a standard $KMnO_4$ solution using phosphoric acid as a catalyst. The oxidizing power was computed as equivalents per 100 grams of material, an equivalent being that amount required to change one mole of $V^{4+}$ to $V^{5+}$.

Inspection of the X-ray powder patterns indicated that there were six phases involved. These phases are those indicated in the diagram of FIGURE 2. In the phase diagram, the solid lines are for an oxygen partial pressure of 0.21 atmosphere air, whereas the dash lines are for one atmosphere. A third coordinate could be present to show the oxygen content of each phase, though it is not deemed necessary.

Since the herein invention is particularly concerned with only one phase of the diagram, that is the $NiMnO_3$ phase, the following table presents only the oxidizing powers and X-ray data for that particular phase. It is shown that the values of the oxidizing powers of the material are within the values calculated on the basis of ideal chemical formulas. This permits one to utilize a very simple chemical method for the accurate determination of certain phase boundaries.

TABLE I

| $R=Mn/(Ni+Mn)$ | Structure | Ignition Temp. (° C.) | Atmosphere |
|---|---|---|---|
| 0.500 | Ilmenite MM'O₃ | 780 | $O_2$ |
| 0.525 | do | 684 | Air |
| 0.525 | do | 743 | $O_2$ |

| Oxidizing Power (equivalents/100 g.) | | Lattice Constants (±0.002 A.) | |
|---|---|---|---|
| Expt. | Theory | $a_0$ | $c_0$ |
| 1.226 | 1.237 | 4.904 | ¹ 13.57 |
| 1.238 | 1.239 | 4.908 | 13.61 |
| 1.236 | 1.239 | | |

¹ Hex.

The above examples briefly describe the method of the herein invention for making of oxide samples used to derive a complete phase diagram from the system $NiO$—$Mn_2O_3$—$O_2$. The results of the phase diagram as indicated in FIGURE 2, show a range wherein the desired ilmenite magnetic material (MM'O₃) $NiMnO_3$ is present. Through the utilization of this phase diagram, one can determine the ratio of ingredients needed to form the compounds as well as the temperature and atmospheric conditions. It is of particular note that the desired compound is obtained over a range of values for R. According to phase e of the phase diagram FIG. 2, it can be seen that R can vary from .5 to approximately .53. Previous to the herein invention, the compound $NiMnO_3$ was not obtainable over a range of values, thus making it that much more difficult to manufacture in pure quantities.

The following detailed example will describe the method of making the product $NiMnO_3$ in accord with the invention utilizing the results derived and shown in FIGURES 1 and 2.

EXAMPLE III

In order to convert material into the oxalate compounds, it is found most expedient to begin with the nickelous and manganous acetates. The acetates are thus the starting materials in the formulation of a compound of the invention. 0.100 mole or 24.81 grams of nickelous acetate and 0.1023 mole or 25.07 grams of manganous acetate were dissolved in 800 ml. of 4% acetic acid solution. As can be seen from FIGURE 2, the resultant end compound will have a 1:1 mole ratio where $R=.5$. FIGURE 1 indicates that when R has a value of .5, C has a value of .0023 mole, thus an excess of this amount of moles of the manganous acetate are initially present. After dissolution of the acetates in the acetic acid solution, the materials were heated to a boiling temperature. During boiling and vigorous stirring, 200 ml. of an aqueous solution containing 0.2023 mole of oxalic acid plus 1 gram excess equalling 26.50 grams was added rapidly. This precipitated the mixed oxalate of nickel and manganous. As indicated in FIGURE 1, a quantity of approximately 0.0023 mole of manganese remains in solution. It was for this reason that the excess was initially added in the presence of the nickelous acetate so that the Ni/Mn ratio of precipitate is very close to the desired value of one. After ten minutes' digestion, the precipitate was separated on a filter, washed with pure water, and dried in air.

The mixed oxalate was heated in a suitable container, such as a boat made of silica. Other containers of inert material, such as platinum, would also suffice. The container was placed inside of a tube made of vycor glass. Fused silica or other refractory gas-type material is also suitable for the construction of this tube. The material was then heated slowly under a liberal stream of pure oxygen, up to a temperature of 780° C. The sample was removed from the furnace and ground in an agate mortar, while being careful not to contaminate it with foreign material. Samples were then heated further in a liberal supply of oxygen at 780° C. for eight hours.

Chemical analysis indicated that the sample prepared had a composition accurately represented by the formula $Ni^{2+}Mn^{4+}O_3$. An analysis of the sample gave 36.14 weight percent nickel, 34.01 weight percent manganese and an oxidizing power 1.230 equivalent for 100 grams. The values corresponding to a formula $NiMnO_3$ were 36.32% Ni, 33.99% Mn and 1.237 equivalents/100 grams for oxidizing power. The X-ray diffraction analysis showed that the sample possessed the ilmenite crystal structure with the hexagonal lattice constants $$a_0=4.904 \text{ A. and } c_0=13.57 \text{ A.}$$

In accordance with the above-detailed example, other oxides of the ilmenite structure can be successfully made, providing there is adherence to the limitations of phase e in the diagram of FIGURE 2. Thus, when the formula compound is written as $Ni_{2-p}Mn_pO_3$, p can vary from 1 to 1.06 using the full ratio R as seen in the phase diagram. The method is carried out varying between the temperatures along the boundary line between the regions e and k of the diagram. As can be seen, the temperature limitations of these regions cannot be exceeded to obtain the desired ilmenite structure. When p is equal, for example, to 1.06, R will then be equivalent to .53 in the phase diagram of FIGURE 2. At this position, it can be seen that a pure ilmenite phase is not stable in air above 705° C. If p is equal to 1, as seen in the phase diagram, a pure ilmenite phase is not stable above 760° C. in air or 810° C. in pure oxygen, as has been previously indicated. It has been found that the oxides, once heated to temperatures above 600° C., are stable at lower temperatures. The lower range to which the material can be heated is not easily ascertainable to assure a satisfactory product. The oxide should be heated to temperatures generally above 600° C. so that they are stable at lower temperatures. Thus, with the aid of the phase diagram of FIGURE 2, the method of this invention utilized in the coprecipitation of oxalates of manganese and nickel can be successfully carried out under conditions to produce the ferromagnetic ilmenite crystal structure.

With regard to the starting soluble salts, it is preferred that acetates of nickel and manganese be utilized, as previously indicated, because the reaction products are insoluble in the final solution. However, other soluble salts can be used including, but not limited to, carbonates, nitrates, sulfates, and the like.

With regard to the oxalic acid utilized to convert the soluble salts to oxalates, the acid is added to the salt solution in a stoichiometric amount to convert the salts to oxalates. Additionally, a slight excess of the oxalic acid is preferred to assure complete conversion to the oxalate.

There has accordingly been described and shown herein a novel, useful and improved method of preparing ferromagnetic crystalline compounds having the formula $NiMnO_3$.

What is claimed is:

1. A method of preparing the pure stable ferromagnetic compound $NiMnO_3$, having a coercive force of about 400 oersteds and being ferrimagnetic up to 164° C., comprising the steps of:

forming an aqueous solution of soluble nickelous and manganous salts of which the molar ratio of Mn/(Ni+Mn) is within the range of 0.50 to 0.53;

coprecipitating a mixture of nickelous and manganous oxalates from said aqueous solution; and heating said mixture in air to a maximum temperature dependent upon said ratio, said maximum temperature being approximately 760° C. for a ratio of 0.50 and decreasing substantially linearly to approximately 705° C. for a ratio of 0.53, and recovering a $NiMnO_3$ having the above defined characteristics.

2. A method of preparing the pure stable ferromagnetic compound $NiMnO_3$, having a coercive force of about 400 oersteds and being ferrimagnetic up to 164° C., comprising the steps of:

forming an aqueous solution of soluble nickelous and manganous salts of which the molar ratio of Mn/(Ni+Mn) is within the range of 0.50 to 0.53;

coprecipitating a mixture of nickelous and manganous oxalates from said aqueous solution; and heating said mixture in oxygen to a maximum temperature dependent upon said ratio, said maximum temperature being approximately 810° C. for a ratio of 0.50 and decreasing substantially linearly to approximately 755° C. for a ratio of 0.53, and recovering a $NiMnO_3$ having the above defined characteristics.

References Cited

UNITED STATES PATENTS

| | | | |
|---|---|---|---|
| 2,636,892 | 4/1953 | Mayer | 252—62.5 |
| 2,677,663 | 5/1954 | Jonker et al. | 23—58 |
| 2,770,523 | 11/1956 | Toole | 252—62.5 |
| 3,039,965 | 6/1962 | Swoboda | 252—62.5 |

OSCAR R. VERTIZ, *Primary Examiner.*

B. H. LEVENSON, *Assistant Examiner.*